US012584056B2

(12) United States Patent
Wang et al.

(10) Patent No.: US 12,584,056 B2
(45) Date of Patent: Mar. 24, 2026

(54) COMPOSITE BODY HAVING HIGH THERMAL CONDUCTIVITY AND METHOD OF MAKING THE COMPOSITE BODY

(71) Applicant: SAINT-GOBAIN CERAMICS & PLASTICS, INC., Worcester, MA (US)

(72) Inventors: Hua Wang, Northbridge, MA (US); Shuai Liang, Southborough, MA (US); Nicholas Watkins, Bellingham, MA (US); Martin Z. Bazant, Wellesley, MA (US); Sarah Elizabeth Plain, Worcester, MA (US); Chuanping Li, Shrewsbury, MA (US); Mark Hampden-Smith, Chelmsford, MA (US); Mithun N. Kamath, Northborough, MA (US); Daniel Shrives, Harvard, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 477 days.

(21) Appl. No.: 18/046,867

(22) Filed: Oct. 14, 2022

(65) Prior Publication Data

US 2023/0132495 A1 May 4, 2023

Related U.S. Application Data

(60) Provisional application No. 63/262,537, filed on Oct. 14, 2021.

(51) Int. Cl.
*C09K 5/14* (2006.01)
*B29B 7/90* (2006.01)
(Continued)

(52) U.S. Cl.
CPC .................. *C09K 5/14* (2013.01); *B29B 7/90* (2013.01); *B29C 48/0021* (2019.02);
(Continued)

(58) Field of Classification Search
CPC .......... C08K 3/38; C08K 2003/382–2003/385; C04B 35/583
See application file for complete search history.

(56) References Cited

U.S. PATENT DOCUMENTS 5,681,883 A 10/1997 Hill
7,189,778 B2 3/2007 Tobita
(Continued)

FOREIGN PATENT DOCUMENTS

CN 113416332 A 9/2021
EP 3616915 A1 * 3/2020 ........... B29C 64/106
(Continued)

OTHER PUBLICATIONS

Lin et al. "Exfoliated hexagonal boron nitride-based polymer nanocomposite with enhanced thermal conductivity for electronic encapsulation", Composites Science and Technology, 90, (2014); pp. 123-128.*
(Continued)

*Primary Examiner* — Prashant J Khatri
(74) *Attorney, Agent, or Firm* — Abel Schillinger, LLP; Adrian Lawrence

(57) ABSTRACT

A composite article can comprise a composite body including an organic polymer and ceramic particles comprising hexagonal boron nitride (hBN) particles distributed throughout the organic polymer, wherein an amount of the hBN particles ranges from 20 vol % to 40 vol % based on a total volume of the body; and the body comprises an in plane thermal conductivity of at least 10 W/mK. The hBN particles within the composite body can have a March-Dollase Orientation parameter η of at least 50%.

23 Claims, 3 Drawing Sheets

10

(51) Int. Cl.

| | |
|---|---|
| *B29C 48/00* | (2019.01) |
| *B29C 48/07* | (2019.01) |
| *B29C 48/18* | (2019.01) |
| *B29C 71/00* | (2006.01) |
| *B29K 509/02* | (2006.01) |
| *B29L 7/00* | (2006.01) |
| *B32B 27/08* | (2006.01) |
| *B32B 27/18* | (2006.01) |
| *B32B 27/28* | (2006.01) |
| *B32B 27/32* | (2006.01) |
| *B32B 27/36* | (2006.01) |
| *B32B 27/38* | (2006.01) |
| *B32B 27/40* | (2006.01) |
| *C08J 5/02* | (2006.01) |
| *C08J 5/18* | (2006.01) |
| *C08K 3/38* | (2006.01) |
| *C08K 9/06* | (2006.01) |
| *C08L 83/04* | (2006.01) |
| *B29K 83/00* | (2006.01) |
| *B29K 307/02* | (2006.01) |

(52) U.S. Cl.

CPC .......... *B29C 48/0022* (2019.02); *B29C 48/07* (2019.02); *B29C 48/185* (2019.02); *B29C 71/0072* (2013.01); *B32B 27/08* (2013.01); *B32B 27/18* (2013.01); *B32B 27/283* (2013.01); *B32B 27/32* (2013.01); *B32B 27/36* (2013.01); *B32B 27/38* (2013.01); *B32B 27/40* (2013.01); *C08J 5/02* (2013.01); *C08J 5/18* (2013.01); *C08K 3/38* (2013.01); *C08K 9/06* (2013.01); *C08L 83/04* (2013.01); *B29K 2083/00* (2013.01); *B29K 2307/02* (2013.01); *B29K 2509/02* (2013.01); *B29K 2995/0007* (2013.01); *B29K 2995/0013* (2013.01); *B29K 2995/0094* (2013.01); *B29K 2995/0097* (2013.01); *B29L 2007/002* (2013.01); *B32B 2250/05* (2013.01); *B32B 2250/24* (2013.01); *B32B 2264/104* (2013.01); *B32B 2264/303* (2020.08); *B32B 2274/00* (2013.01); *B32B 2307/20* (2013.01); *B32B 2307/302* (2013.01); *B32B 2307/7376* (2023.05); *C08J 2383/04* (2013.01); *C08K 2003/385* (2013.01); *C08K 2201/001* (2013.01); *C08K 2201/005* (2013.01); *C08K 2201/016* (2013.01)

(56) References Cited

U.S. PATENT DOCUMENTS

| | | | |
|---|---|---|---|
| 7,445,797 | B2 | 11/2008 | Meneghetti |
| 7,524,560 | B2 | 4/2009 | Paisner |
| 8,404,768 | B2 | 3/2013 | Ramasamy |
| 8,921,507 | B2 | 12/2014 | Yoshihara |
| 8,933,157 | B2 | 1/2015 | Meneghetti |
| 8,946,333 | B2 | 2/2015 | Raman |
| 8,946,335 | B2 | 2/2015 | Yoshihara |
| 9,023,462 | B2 | 5/2015 | Lee |
| 9,227,354 | B2 | 1/2016 | Chang |
| 9,573,312 | B2 | 2/2017 | Cruz |
| 9,656,868 | B2 | 5/2017 | Nishi |
| 10,328,620 | B2 | 6/2019 | Uibel |

| | | | |
|---|---|---|---|
| 2007/0001292 | A1 | 1/2007 | Ohta |
| 2007/0045823 | A1 | 3/2007 | Miller |
| 2011/0045223 | A1* | 2/2011 | Lin ..................... C01B 21/0687 |
| | | | 423/276 |
| 2011/0155948 | A1 | 6/2011 | Namkung |
| 2011/0192588 | A1 | 8/2011 | Suzuki |
| 2013/0143981 | A1 | 6/2013 | Miyata |
| 2014/0077125 | A1 | 3/2014 | Lin |
| 2016/0145411 | A1 | 5/2016 | Uibel |
| 2016/0325993 | A1 | 11/2016 | Søgaard |
| 2016/0325994 | A1 | 11/2016 | Qu |
| 2017/0218171 | A1* | 8/2017 | Leach ..................... H05K 3/00 |
| 2019/0176448 | A1 | 6/2019 | Mukohata |
| 2019/0176488 | A1 | 6/2019 | Nakano |
| 2019/0337803 | A1 | 11/2019 | Otsuka |
| 2020/0056094 | A1 | 2/2020 | Lim et al. |
| 2021/0070952 | A1 | 3/2021 | Suzumura |
| 2022/0128748 | A1 | 4/2022 | Jones |
| 2023/0018988 | A1 | 1/2023 | Kim |

FOREIGN PATENT DOCUMENTS

| | | | |
|---|---|---|---|
| JP | 2007182369 A | | 7/2007 |
| JP | 2010505729 A | | 2/2010 |
| JP | 2012255055 A | * | 12/2012 |
| JP | 2016017086 A | | 2/2016 |
| JP | 2018159062 A | | 10/2018 |
| JP | 2020045456 A | | 3/2020 |
| KR | 1020160125711 A | | 11/2016 |
| KR | 102123231 B1 | | 6/2020 |
| WO | 2020100482 A1 | | 2/2021 |

OTHER PUBLICATIONS

Machine translation of JP 2012-255055. Retrieved Nov. 17, 2025.*

Chen et al. "Millefeuille-Inspired Thermally Conductive Polymer Nanocomposites with Overlapping BN Nanosheets for Thermal Management Applications", ACS Nano, 13, (2019); pp. 337-345.*

Chen et al. "Highly Thermally Conductive Yet Electrically Insulating Polymer/Boron Nitride Nanosheets Nanocomposite Films for Improved Thermal Management Capability", ACS Applied Materials & Interfaces, 11, (2019); pp. 31402-31410.*

E. Zolotoyabko "Determination of the degree of preferred orientation within the March-Dollase approach", J. Appl. Cryst (2009) 42 513-518.

W. A. Dollase "Correction of Intensities for Preferred Orientation in Powder Diffractometry: Application of the March Model", J. Appl. Cryst. (1986). 19, 267-272.

International Search Report dated Feb. 1, 2023 with regard to International Application No. PCT/US2022/078163.

Bashkirov Et al.; "Influence of annealing on microstructure and optical properties of hot wall deposited PbxSn(1-x)S thin films", Thin Solid Films 616 (2016) 773-779.

Lee, "Scalable Exfoliation Process for Highly Soluble Boron Nitride Nanoplatelets by Hydroxide-Assisted Ball Milling".

Hot Disk Thermal Constants Analyser Instruction Manual, Revision date Apr. 15, 2015.

Liang Di et al: "Synergetic enhancement of thermal conductivity by constructing BN and AIN hybrid network in epoxy matrix", Journal of Polymer Research, Springer Netherlands, Dordrecht, vol. 27, No. 8, Jul. 13, 2020 (Jul. 13, 2020), XP037190986, 12 pages.

Zhao Kechen et al: "A combination of nanodiamond and boron nitride for the preparation of polyvinyl alcohol composite film with high thermal conductivity", Polymer, Elsevier, Amsterdam, NL, vol. 206, Aug. 6, 2020 (Aug. 6, 2020), XP086269338, 9 pages.

* cited by examiner

COMPOSITE BODY HAVING HIGH THERMAL CONDUCTIVITY AND METHOD OF MAKING THE COMPOSITE BODY

CROSS-REFERENCE TO RELATED APPLICATION(S)

This application claims priority under 35 U.S.C. § 119(e) to U.S. Patent Application No. 63/262,537, entitled "COMPOSITE BODY HAVING HIGH THERMAL CONDUCTIVITY AND METHOD OF MAKING THE COMPOSITE BODY," by Hua WANG et al., filed Oct. 14, 2021, which is assigned to the current assignee hereof and incorporated herein by reference in its entirety.

FIELD OF THE DISCLOSURE

The present disclosure relates to a composite body including an organic polymer and ceramic particles comprising hexagonal boron nitride (hBN) particles distributed throughout the organic polymer with a high degree of orientation, and methods of making the composite body.

BACKGROUND

Thermally conductive polymer composites play an essential role in a variety of industries with regard to thermal management of electrical devices, as they can significantly lower the operating temperature and prolong the life of a device by dissipating heat to avoid overheating. Typical industries wherein thermally conductive polymer composites play a critical role include consumer electronics (e.g., cell phones, tablets), telecommunication infrastructure (e.g., cell towers), LED lighting, hybrid, and electric vehicles (power modules), data centers (server boards, switches, supervisor modules, and power supplies), and solar cells.

There exists a need to further enhance the variety and efficiency of materials suitable for thermal management.

BRIEF DESCRIPTION OF THE DRAWINGS

The present disclosure may be better understood, and its numerous features and advantages made apparent to those skilled in the art by referencing the accompanying drawings.

DETAILED DESCRIPTION

As used herein, the terms "comprises," "comprising," "includes," "including," "has," "having" or any other variation thereof, are intended to cover a non-exclusive inclusion.

For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present), and B is false (or not present), A is false (or not present), and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The present disclosure is directed to a composite article comprising a composite body including an organic polymer and ceramic particles comprising hexagonal boron nitride (hBN) particles distributed throughout the organic polymer, wherein the amount of the hBN particles can range from 20 vol % to 40 vol % based on a total volume of the composite body, an amount of the ceramic particles may be not greater than 50 vol % based on the total volume of the composite body; and the composite body can comprises an in plane thermal conductivity of at least 10 W/mK.

Figure 1A:
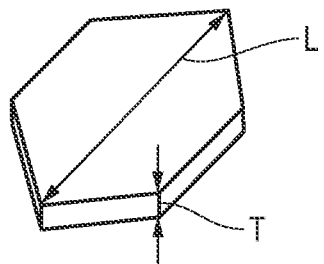
FIG. 1A includes a line drawing illustrating a platelet type hBN particle according to one embodiment.

As used herein, the term hBN particles, if not indicated otherwise, relates to platelet shaped hBN particles having an average aspect ratio of length to thickness (L/T) of at least 5, as also illustrated in FIG. 1A.

Figure 1B:
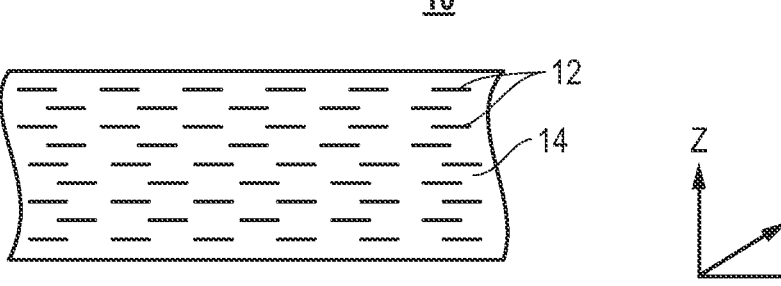
FIG. 1B includes a line drawing illustrating a side view of a cross-cut of a composite body having in-plane oriented hBN particles according to one embodiment.
Figure 1C:
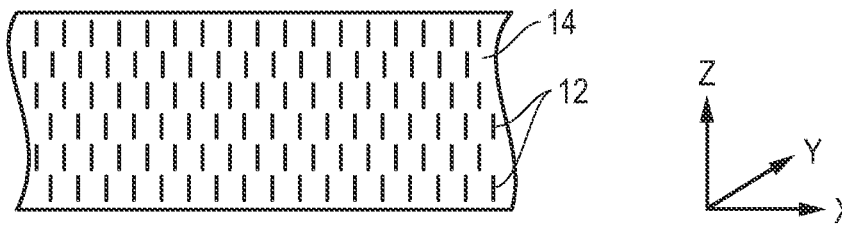
FIG. 1C includes a line drawing illustrating a side view of a cross-cut of a composite body having through-plane oriented hBN particles according to one embodiment.

As further used herein, the term "in-plane" relates to the x-y direction of the composite body. FIG. 1B illustrates the cross-cut (10) of a composite body wherein the hBN particles (12) can be oriented (herein also called aligned) in the x-y direction of the body, which is interchangeable called herein "in-plane." In contrast, FIG. 1C illustrates an embodiment of a composite slice wherein the hBN particles (12) are aligned in z-direction, also called interchangeable herein "through-plane" or thickness direction of the body.

In one embodiment, the composite body of the present disclosure can be made by preparing a mixture comprising ceramic particles including hBN and an organic polymer; applying a layer of the mixture to a mold or a support; conducting an alignment procedure of the hBN particles; and solidifying and/or curing the organic polymer to form the composite body.

In one aspect, the alignment procedure can comprises applying a pressure orthogonal to the in-plane direction (x-y direction) of the layer of the mixture. In certain aspects, the pressure can be applied by forming a layer on a 12"×12" metal plate and applying with a second metal plate of the same size pressure on the layer, wherein the weight applied on the second metal plate can be at least 40,000 lbs, or at least 50,000 lbs, or at least 60,000 lbs, or at least 70,000 lbs. In a further aspect, the weight on the second plate may be not greater than 150,000 lbs.

In one embodiment, the method can comprise surface functionalizing the hBN particles before preparing the mixture. Surface functionalization can include exfoliating and activating of the hBN particles to form activated hBN particles and treating the activated hBN particles with an organic compound.

In one aspect, activating can comprise introducing OH-groups on an outer surface of the hBN particles.

In a certain aspect, exfoliation can be a mechanical process wherein the hBN platelet particles can be cleaved or peeled causing an increase in the surface area of the hBN particles. Activation of the hBN particles can be a treatment of the hBN particles with an alkaline fluid, which may cause introducing OH groups on the surface of the hBN particles by covalent bonds.

In a particular aspect, exfoliating and activating can be conducted concurrently. In a certain particular aspect, exfoliation of the hBN particles can include ball-milling using as liquid medium aqueous sodium hydroxide solution.

The exfoliated and activated hBN particle can be further subjected to surface functionalization with an organic compound. In a particular aspect, the organic compound can be a polysiloxane comprising silicon hydride groups, or a polysilane, or a silane compound, or any combination thereof.

In a certain particular aspect, chemically reacting of a silane compound with the hBN particles can further include using a boron catalyst. In a non-limiting example, the boron catalyst can include tri(pentafluorophenyl)borane.

After exfoliation and activation of the hBN particles, a chemical reaction can be conducted between the introduced OH-groups and the selected organic compound to covalently attach the organic compound to the surface of the hBN particles, also called herein grafting.

In a certain embodiment, grafting the surface of the hBN particles can be conducted with a polysiloxane comprising silicone hydride groups as organic compound. In a particular aspect, the composite body can comprise surface functionalized hBN particles grafted with a polysiloxane, and as organic polymer a silicone polymer in which the hBN particles are distributed.

The surface functionalization may not be limited to polysiloxane grafting and can include any other monomer, oligomer, or polymer that is able to react with the introduced OH-groups of the exfoliated hBN particles. Not being bound to theory, the grafted surface of the hBN particles can make the particles more compatible with the organic polymer matrix, thereby enabling a lower process viscosity which may cause easier alignment and an improved homogenous curing.

In aspects, the organic polymer of the composite body can be a thermoplastic polymer or a thermoset polymer.

In a particular aspect, the organic polymer can be a polymerizable polymer including functional groups. In a certain particular aspect, curing of the polymerizable monomer may be required after and/or during compression molding.

Non-limiting examples of the polymerizable polymer can include a silicone polymer, or an acrylate polymer, or an epoxy polymer.

In a certain particular aspect, the polymerizable polymer can be a silicone polymer comprising vinyl groups. In a non-limiting embodiment, the silicone polymer comprising vinyl groups can be polymerized by cross-linking with a cross-linking agent. In one aspect, the weight percent ratio of silicone polymer comprising vinyl groups to cross-linking agent can be between 0.5 to 5, or 1 to 3, or 1 to 2.

In certain aspects, the silicone polymer can have a molecular weight of at least 10,000 g/mol, at least 100,000 g/mol, at least 200,000 g/mol, at least 400,000 g/mol, or at least 700,000 g/mol. In other certain aspects, the molecular weight of the silicone polymer may be not greater than 1,000,000 g/mol, or not greater than 800,000 g/mol, or not greater than 700,000 g/mol, or not greater than 500,000 g/mol, or not greater than 300,000 g/mol, or not greater than 100,000 g/mol.

In another particular aspect, the organic polymer can be a thermoplastic polymer. Non-limiting examples of thermoplastic polymers can include a polyethylene, a polypropylene, a polystyrene, a polyurethane, a polyacrylate, a polyester, a polycarbonate, a polyimide, a polybutylene terephthalate (PBT), polymethyl methacrylate (PMMA), a polyethylene terephthalate (PET), a polyamide, a liquid crystalline polymer (LCP), a polyacrylonitrile (PAN), a polyether ether ketone (PEEK), a polyetherketoneketone (PEKK), a polysulfone, a polyethersulfone, a polyphenylene oxide (PPO), a polyetherimide, a thermoplastic elastomer (TPE, olefinic or styrenic), a fluoropolymer such as polyvinylidene fluoride (PVDF), a perfluoroalkoxy alkanes (PFA), a fluorinated ethylene propylene (FEP), or an ethylene tetrafluoroethylene (ETFE), or any copolymer thereof, or any combination thereof.

In a particular aspect, the composite body can comprise surface functionalized hBN particles grafted with a polysiloxane, and as organic polymer a silicone polymer in which the hBN particles are distributed.

In another certain particular aspect, the hBN particles can be surface functionalized via fluorine surface functionalization and combined with a silicone polymer. Examples of fluorine surface functionalization can include plasma treatment with CF4, or CHF3, $SF_6$, or $C_2F_6$.

In another aspect, the organic polymer can be an epoxy polymer, and the hBN particles may be surface functionalized with an epoxy compound, or an amine, or hydroxyl-groups. Non-limiting examples of introducing epoxy-compounds can be plasma treatment with glycidyl methacrylate or plasma treatment with allyl glycidyl ether. Examples of amine functionalization can include plasma treatment with allylamine or 3-(aminopropyl) triethoxysilane.

In a further aspect, the organic polymer can be a polyethylene, and the hBN particles can be subjected to fluorine surface functionalization, or silane functionalization.

In yet another aspect, the organic polymer can be a thermoplastic polyurethane (TPU) or polybutylene terephthalate (PBT), and the hBN particles can be functionalized with an epoxy compound, an amine, or hydroxyl groups. In certain further aspects, PBT can be also surface functionalized by oxygen plasma treatment, air-plasma treatment, treatment with boric acid/urea combined with thermal treatment, or boric acid/melamine combined with thermal treatment.

In certain aspects, the composite body of the present disclosure can have an in-plane thermal conductivity of at least 10 W/mK with a corresponding amount of the hBN particles being not greater than 39 vol %, or not greater than 38 vol %, or not greater than 37 vol %, or not greater than 36 vol %, or not greater than 35 vol %, or not greater than 34 vol %, or not greater than 33 vol %, or not greater than 32 vol %, or not greater than 31 vol %, or not greater than 30 vol %, or not greater than 29 vol, or not greater than 28 vol %, or not greater than 25 vol %.

In a particular embodiment, the majority of the ceramic particles contained within the composite body can be hBN particles, such as at least 90 vol % based on the total volume of ceramic particles, or at least 92 vol %, or at least 94 vol %, or at least 96 vol %, or at least 98 vol %, or at least 99 vol %. In a certain particular embodiment, the ceramic particles can consist essentially of hBN particles, wherein consisting essentially of hBN particle means herein having not more than 0.5 vol % ceramic particles which are not hBN particles.

The orientation of the hBN particles within the body (herein also called interchangeable alignment of the hBN particles) can be measured by conducting X-ray diffracto-metry and analyzing the X-ray spectrum according to the March-Dollase method (see detailed description in the examples). It was found that the March-Dollase orientation parameter η can be a suitable quantitative expression for characterizing the degree of alignment of the dispersed hBN particles within the composite body. A good alignment is considered in the present disclosure a March-Dollase orien-tation parameter η of at least 50%. In certain aspects, the March-Dollase orientation parameter of the hBN particles in the composite body can be at least 52%, or at least 54%, or at least 56%, or at least 58%, or at least 60%.

As further demonstrated in the examples, it has been surprisingly found that a certain combination of mechanical exfoliation and chemical treatment of the hBN particles before functionalization with an organic compound can lead to a thermal conductivity of at least 10 W/mK at hBN concentrations below 40 vol %.

In one embodiment, the hBN particles can have an average aspect ratio of length (L) to thickness (T) of the hBN particles of at least 5, or at least 7, or at least 10, or at least 20, or at least 30, or at least 40, or at least 50, or at least 60, or at least 70, or at least 80, or at least 90, or at least 100, or at least 110, or at least 120. In another aspect, the aspect ratio may be not greater than 200, or not greater than 120, or not greater than 80, or not greater than 50, or not greater than 30, or not greater than 15.

In another embodiment, the hBN particles can have an average particle size (D50) of at least 1 micron, or at least 3 microns, or at least 5 microns, or at least 10 microns, or at least 15 microns, or at least 20 microns, or at least 25 microns, or at least 30 microns. In a further aspect, the hBN particles may have an average particle size of not greater than 100 microns, or not greater than 50 microns, or not greater than 45 microns, or not greater than 40 microns, or greater than 35 microns, or not greater than 30 microns, or not greater than 25 microns, or not greater than 20 microns, or not great than 10 microns, or not great than 5 microns.

In a certain embodiment, the hBN particles of the com-posite body can have a multi-modal particle distribution, for example, a bi-modal or three-modal distribution. In a par-ticular aspect, the particles distribution can be a bi-modal particle distribution (PSD).

In one aspect, the particle size distribution of the hBN particles can include a first peak having a first peak maxi-mum and a second peak having a second peak maximum, and an intensity ratio of the first peak maximum to the second peak maximum can be at least 1.5:1, or at least 2:1 or at least 2.5:1, or at least 3.0:1. In another aspect, the intensity ratio of the first peak maximum to the second peak maximum may be not greater than 10:1, or not greater than 7:1 or not greater than 5:1, or not greater than 4:1, or not greater than 3.5:1, or not greater than 3.0:1.

In another aspect, the distance between the first peak maximum and the second peak maximum of the hBN particle size distribution can be at least 20 microns, or at least 25 microns, or at least 30 microns, or at least 35 microns. In a further aspect, the distance between the first peak maximum and the second peak maximum may be not greater than 70 microns, or not greater than 60 microns, or not greater than 50 microns, or not greater than 40 microns, or not greater than 35 microns.

In yet a further aspect, the first peak maximum can correspond to a hBN particles size in a range of 8 microns to 13 microns, and the second peak maximum may corre-sponds to a hBN particle size in a range of 35 to 50 microns.

In another aspect, the eighty percent distribution value (D90-D10) of the hBN particle distribution can be at least 15 microns, or at least 20 microns, or at least 25 microns, or at least 30 microns, or at least 35 microns, or at least 40 microns, or at least 45 microns, or at least 50 microns. In another aspect, the eighty percent distribution value (D90-D10) of the hBN particle distribution may be not greater than 80 microns, or not greater than 70 microns, or not greater than 60 microns, or not greater than 50 microns, or not greater than 45 microns, or not greater than 40 microns.

In a particular embodiment, the majority of the ceramic particles contained within the body can be hBN particles, such as at least 90 vol % based on the total volume of ceramic particles, or at least 92 vol %, or at least 94 vol %, or at least 96 vol %, or at least 98 vol %, or at least 99 vol %. In a certain particular embodiment, the ceramic particles can consist essentially of hBN particles, wherein consisting essentially of hBN particle means herein having not more than 0.5 vol % ceramic particles which are not hBN par-ticles.

It has been surprisingly observed that certain surface functionalized hBN particles may be dispersed within the organic polymer with a high degree of orientation already at hBN concentrations equal to or below 40 vol % based on the total volume of the composite body, such that a thermal conductivity of the composited body of at least 10 W/mK can be obtained.

Many different aspects and embodiments are possible. Some of those aspects and embodiments are described herein. After reading this specification, skilled artisans will appreciate that those aspects and embodiments are only illustrative and do not limit the scope of the present inven-tion. Embodiments may be in accordance with any one or more of the embodiments as listed below.

EMBODIMENTS

Embodiment 1. A composite article comprising: a com-posite body including an organic polymer and ceramic particles comprising hexagonal boron nitride (hBN) par-ticles distributed throughout the organic polymer, wherein an amount of the hBN particles ranges from 20 vol % to 40 vol % based on a total volume of the composite body;

an amount of the ceramic particles is not greater than 50 vol % based on the total volume of the composite body; and the composite body comprises an in plane thermal con-ductivity of at least 10 W/mK.

Embodiment 2. The composite article of Embodiments 1, wherein an in-plane March-Dollase orientation parameter η of the hBN particles within the composite body is at least 50%, or at least 51%, or at least 52%, or at least 53%, or at least 54%, or at least 55%, or at least 56%, or at least 57% or at least 58%, or at least 59%, or at least 60%, or at least 61%, or at least 62%, or at least 63%, or at least 64%, or at least 65%.

Embodiment 3. The composite article of any one of the preceding Embodiments, wherein an average aspect ratio of length to thickness of the hBN particles is at least 5, or at least 10, or at least 20, or at least 30, or at least 40, or at least 50, or at least 60, or at least 70, or at least 80, or at least 90, or at least 100, or at least 110, or at least 120.

Embodiment 4. The composite article of any one of the preceding Embodiments, wherein the average aspect ratio of the hBN particles is not greater than 200, or not greater than 120, or not greater than 80, or not greater than 50.

Embodiment 5. The composite article of any one of the preceding Embodiments, wherein the hBN particles have an average particle size (D50) of at least 1 micron, or at least 3 microns, or at least 5 microns, or at least 10 microns, or at least 15 microns, or at least 20 microns, or at least 25 microns, or at least 30 microns, or at least 35 microns.

Embodiment 6. The composite article of any one of the preceding Embodiments, wherein the hBN particles have an average particle size of not greater than 100 microns, or not greater than 70 microns, or not greater than 50 microns, or not greater than 45 microns, or not greater than 40 microns, or greater than 35 microns, or not greater than 30 microns, or not greater than 25 microns, or not greater than 20 microns, or not great than 10 microns, or not great than 5 microns.

Embodiment 7. The composite article of any one of the preceding Embodiments, wherein the hBN particles have a multi-modal distribution.

Embodiment 8. The composited article of Embodiment 7, wherein the hBN particles include a combination of three different particle size ranges.

Embodiment 9. The composite article of Embodiments 7 or 8, wherein the hBN particles comprise a first portion of hBN particles having an average particle size between 3 and 7 microns, a second portion of hBN particles having an average particles size between 12 and 20 microns, and a third portion of hBN particles having an average particles size between 25 and 35 microns.

Embodiment 10. The composite article of Embodiment 9, wherein a volume ratio of the first portion to the second portion and to the third portion ranges from 0.7:1.0:1.3 to 1.3:1.0:0.7, or from 0.8:1.0:1.2 to 1.2:1.0:0.8, or from 0.9:1.0:1.1 to 1.1:1.0:0.9.

Embodiment 11. The composite article of any one of the preceding Embodiments, wherein an electric volume resistivity of the composite body is at least 1.0E+12; or at least 1.0E+13, or at least 1.0E+14.

Embodiment 12. The composite article of any one of the preceding Embodiments, wherein the organic polymer of the composite body includes a thermoplastic polymer or a thermoset polymer.

Embodiment 13. The composite article of Embodiment 14, wherein the organic polymer includes a silicone polymer, an acrylate polymer, a polyurethane, an epoxide polymer, a polyamide, a polyimide, a liquid crystalline polymer (LCP), a fluoropolymer, a polyethylene, a polypropylene, a polystyrene, a polyester, a polycarbonate, a polybutylene terephthalate (PBT), a polyethylene terephthalate (PET), a polyamide, a liquid crystalline polymer (LCP), a polyacrylonitrile (PAN), a polyether ether ketone (PEEK), a polyetherketoneketone (PEKK), a polysulfone, a polyethersulfone, a polyphenylene oxide (PPO), a polyetherimide, a thermoplastic elastomer (TPE, olefinic or styrenic), a polyvinylidene fluoride (PVDF), a perfluoroalkoxy alkane (PFA), a fluorinated ethylene propylene (FEP), an ethylene tetrafluoroethylene (ETFE), or any copolymer thereof, or any combination thereof.

Embodiment 14. The composite article of any one of the preceding Embodiments, wherein the organic polymer includes a silicone polymer.

Embodiment 15. The composite article of Embodiment 16, wherein the organic polymer consists essentially of the silicone polymer.

Embodiment 16. The composite article of any one of Embodiments 16 or 17, wherein the silicone polymer has a molecular weight of at least 10,000 g/mol, at least 100,000 g/mol, at least 200,000 g/mol, at least 400,000 g/mol, or at least 700,000 g/mol.

Embodiment 17. The composite article of any one of Embodiments 16-18, wherein the silicone polymer has a molecular weight not greater than 1,000,000 g/mol, or not greater than 800,000 g/mol, or not greater than 700,000 g/mol, or not greater than 500,000 g/mol, or not greater than 300,000 g/mol, or not greater than 100,000 g/mol.

Embodiment 18. The composite article of any one of the preceding Embodiments, wherein the composite body further comprises a surfactant.

Embodiment 19. The composite article of Embodiment 17, wherein an amount of the surfactant is at least 0.1 w % and not greater than 5 w %.

Embodiment 20. The composite article of Embodiments 27 or 28, wherein the surfactant is a polysiloxane.

Embodiment 21. The composite article of any of the preceding Embodiments, wherein an amount of the hBN particles is 92 vol % based on the total volume of ceramic particles, or as at least 94 vol %, at least 96 vol %, or least 98 vol %, or at least 99 vol %.

Embodiment 22. The composite article of any of the preceding Embodiments, wherein the ceramic particles of the composite boy consist essentially of hBN particles.

Embodiment 23. The composite article of any one of the preceding Embodiments, wherein the amount of the hBN particles is not greater than 39 vol % based on the total volume of the body, or not greater than 38 vol %, or not greater than 37 vol %, or not greater than 36 vol %, or not greater than 35 vol %.

Embodiment 24. The composite article of any one of the preceding Embodiments, wherein the amount of the hBN particles is at least 21 vol % based on the total volume of the body, or at least 22 vol %, or at least 23%, or at least 24%, or at least 25%, or at least 26%, or at least 27%, or at least 28%, or at least 29%, or at least 30%, or at least 31%, or at least 32%, or at least 33%, or at least 34%.

Embodiment 25. The composite article of any one of the preceding Embodiments, wherein the thermal conductivity of the composite body is at least 10.5 W/mK, or at least 11.0 W/mK, or at least 11.5 W/mK, or at least 12 W/mK, or at least 12.5 W/mK, or at least 13.0 W/mK, or at least 13.5 W/mK, or at least 14 W/mK, or at least 14.5 W/mK, or at least 15.0 W/mK, or at least 15.5 W/mK, or at least 16 W/mK, or at least 16.5 W/mK, or at least 17.0 W/mK, or at least 17.5 W/mK, or at least 18 W/mK, or at least 18.5 W/mK, or at least 19.0 W/mK, or at least 19.5 W/mK, or at least 20 W/mK.

Embodiment 26. The composite article of any one of the preceding Embodiments, wherein the thermal conductivity of the composite body is not greater than 40 W/mK, or not greater than 30 W/mK, or not greater than 20 W/mK.

Embodiment 27. The composite article of any one of the preceding Embodiments, wherein a surface of the hBN particles is functionalized with an organic compound.

Embodiment 28. The composite article of Embodiment 27, wherein the organic compound is selected from a polysiloxane, a polysilane, a silane, or any combination thereof.

Embodiment 29. The composite article of Embodiment 28, wherein the organic compound is polysiloxane.

Embodiment 30. The composite article of any one of Embodiments 27-29, wherein the organic compound is covalently bonded to the surface of the hBN particles.

Embodiment 31. The composite article of any one of Embodiments 25-26, wherein the polysiloxane has a molecular weight of at least 100 and not greater than 100,000.

Embodiment 32. The composite article of Embodiment 27, wherein the organic compound includes a fluorine containing compound, an epoxy-compound, or an amine.

Embodiment 33. A method of forming a composite article, comprising:

preparing a mixture of ceramic particles and an organic polymer, wherein the ceramic particles comprise hBN particles, an amount of the hBN particles ranges from 20 to 40 vol % based on a total weight of the dispersion and a total amount of ceramic particles being not greater than 50 vol % based on the total volume of the body, applying a layer of the mixture to a mold or support;

conducting an alignment procedure of the hBN particles; and solidifying and/or curing the organic polymer or organic polymerizable material to form a composite body, wherein an in-plane thermal conductivity of the composite body is at least 10 W/mK.

Embodiment 34. The method of Embodiment 33, further comprising surface functionalizing the hBN particles before preparing the mixture.

Embodiment 35. The method of Embodiment 34, wherein surface functionalization includes exfoliating and activating the hBN particles to form activated hBN particles and treating the activated hBN particles with an organic compound.

Embodiment 36. The method of Embodiment 35, wherein activating comprises introducing OH-groups on an outer surface of the hBN particles.

Embodiment 37. The method of Embodiments 34 or 35, wherein exfoliating and activating is conducted concurrently.

Embodiment 38. The method of any one of Embodiments 34-37, wherein exfoliating includes ball-milling.

Embodiment 39. The method of any one of Embodiments 35 to 38, wherein the organic compound is a polysiloxane comprising silicon hydride groups, or a polysilane, or a silane compound, or any combination thereof.

Embodiment 40. The method of Embodiment 39, wherein treating comprises chemically reacting the hBN particles with the organic compound.

Embodiment 41. The method of Embodiment 40, wherein chemically reacting the hBN particles with the organic compound comprises using a boron catalyst.

Embodiment 42. The method of Embodiment 41, wherein the boron catalyst comprises tri(pentafluorophenyl)borane.

Embodiment 43. The method of any one of Embodiments 33-42, wherein the alignment procedure comprises applying a pressure on the layer of the mixture.

Embodiment 44. The method of Embodiment 43, wherein the pressure is adjusted that a degree of an in-plane March-Dollase orientation parameter of the body after curing is at least 50%.

Embodiment 45. The method of Embodiments 43 or 44, wherein the pressure is at least 2 MPa, or at least 100 MPa, or at least 500 MPa.

EXAMPLES

The following non-limiting examples illustrate the present invention.

Example 1

Preparing of activated hBN powders.

Different treatments were conducted in order to prepare an activated hBN (hBN containing OH-groups on the surface) for use as starting material for silane functionalization.

In all the conducted experiments of the series, hBN particles having an average particle size of 30 microns and an aspect ratio of 8-10 were used as starting material, and subjected to different types of exfoliation combined with introducing OH-groups on the outer surface of the hBN particles, before conducting a surface functionalization with silane.

Exfoliation and Activation with NaOH (Sample BN1)

The hBN powder was subjected to an exfoliation treatment by using a PQ-N4 planetary ball mill containing zirconia beads (Across International). The ratio of hBN powder to the zirconia beads was about 50:1. For the milling 200 g of the hBN powder was combined with 500 ml 2M NaOH and milled for 12 hours at 200 rpm. Thereafter, the speed of the mill was increased to 400 rpm and milled for another 12 or 24 hours. After the milling, the zirconia beads were removed and the hBN platelets were rinsed with diluted HCl solution and washed with water via vacuum filtration until a neutral pH was obtained. The final powder was dried in a vacuum oven at 50-60° C.

Exfoliation in Neutral Solvent (Sample BN2)

The same experiment was conducted as described above for making sample BN1, except that neutral water (deionized water) was used.

Sonication and Polydopamine (PDA) Treatment (Sample BN3)

200 g of the hBN powder was and 300 ml isopropylacohol (IPA) was mixed together in a FlackTek Speedmixer, followed by ultrasonication for 30 minutes to conduct exfoliation.

The exfoliated hBN was further subjected to PDA functionalization in order to introduce hydroxyl groups on the surface of the hBN particles.

The PDA functionalization was conducted by immersing 20 g of the exfoliated hBN into a solution of 8 g dopamine hydrochloride, 300 ml of tris-buffer solution (10 mM, pH 8.5) and 100 ml ethanol solution. The mixture was stirred for 12 hours at room temperature under exclusion of light. The treated hBN powder was separated by centrifuging at 4000 rpm for 15 minutes, washed with deionized water and ethanol, and dried at 60° C. for 12 hours.

$O_2$ Plasma Activation (Sample BN4)

The plasma treatment of the hBN powder was conducted using a Pico-SR-PCCE-C low pressure plasma reactor manufactured by Diener Electronics. It is known that during oxygen plasma treatment hydroxyl groups are grafted on the surface of the hBN platelets.

The plasma treatment was conducted with a batch size of 15 g hBN in a 50% $O_2$/50% Air mixture, at a pressure of 0.3 mbar, a power of 100 W and for 12 minutes. The combination of O2 and air was selected in order to introduce water vapor for the hydroxyl formation in the plasma gas.

Glycidyl Methacrylate Plasma Polymerization (Sample BN5)

Glycidyl methacrylate (GMA) is an epoxy functional monomer which can be polymerized via plasma-enhance chemical vapor deposition (PECVD). Applying a power ≥40 W promotes opening of the epoxide rings and creation of hydroxyl groups.

Plasma activation of the hBN powder was conducted with air gas, at a power of 100 W, a pressure of 0.3 mbar for 5 minutes.

Example 2

Functionalization of activated hBN particles via the Piers-Rubinsztajn reaction.

The activated hBN powder samples of Example 1 (BN1, BN2, BN3, BN4, and BN5) were subjected to functionalization by siliconization via the Piers-Rubinsztajn reaction according to the following procedure: 50 g of the activated hBN powder was dispersed in 300 ml anhydrous toluene in a 500 ml round-bottomed flask with reflux condenser under $N_2$ atmosphere, to which 30 mg of the catalyst tris(pentafluorophenyl)borane—$B(C_6F_5)_3$—in 1 mL toluene was added under stirring. Furthermore, the flask contained glass beads (number 40, with a diameter of 6 mm) to facilitate the reaction at the interface of the glass beads and to disrupt the hBN stacks formed during the exfoliation. After adding the catalyst, 4.0 ml of silicon hydride (DMS-H11 from Gelest) was slowly added to the reaction mixture followed by continuing stirring for 12 hours at a temperature of 60° C.

Thereafter, the reaction mixture was filtered and the siliconized hBN particles were washed with toluene and IPA to remove non-grafted silicone.

Figure 3:
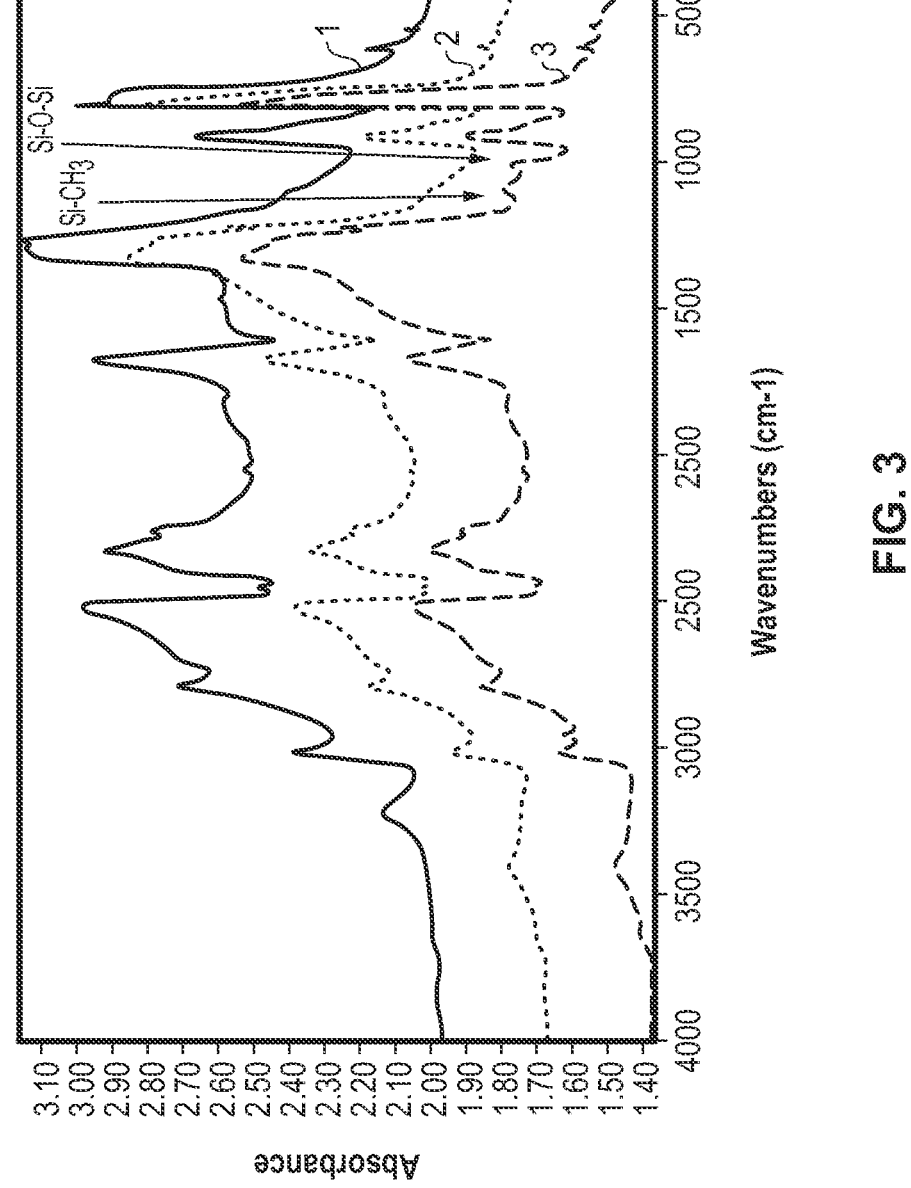
FIG. 3 includes IR spectra of hBN particles before and after exfoliation and siliconization according to one embodiment.

As proof that the silicone chains were grafted on the hBN particles, DRIFT IR measurements were conducted using the siliconized BN1 powder sample. The IR spectra (see FIG. 3, spectrum 3) clearly shows the characteristic peaks for Si—$CH_3$ and Si—O—Si expected by the crafting reaction, which confirmed the successful grafting. In comparison, IR spectra 1 and 2 shown in FIG. 3 are made from hBN particles before the functionalization (1), and before functionalization, and after exfoliation and activation (2).

A summary of the different types of hBN powders used for the experiments of forming hBN-silicone composite bodies is shown in Table 1.

Preparing of hBN—Silicone Composite Bodies

After conducting the siliconization of the activated hBN powder samples, composite bodies were prepared using a silicone polymer as matrix for distributing the hBN particles.

The following procedure was conducted: Mixtures were prepared by combining 34 vol % of the hBN particles sample with a silicone-gum (AB specialty Andigum H110-0) and 2,4-dichlorobenzoyl peroxide (50% in polydimethylsiloxane; Gelest) as crosslinking agent. The weight percent ratio of the crosslinking agent to silicone was about 1-1.5. The mixtures further contained 2 wt % Siltech silicone surfactant and 3 wt % Evonik VS10000. The mixing of the dispersions was conducted in a Brabender mixture for about 40 minutes at room temperature.

From the prepared hBN dispersions, composite bodies were made by pouring a layer of the dispersion mixture on a metal plate and pressing to a pre-determined thickness by applying a pressure of 34-46 MPa for 20 minutes. Specifically, the pressing was conducted between two 12"×12" metal plates with an applied weight of 60,000 lbs. The pre-determined thickness was made by pressing the mixture between two metal plates containing a shim as spacer with the desired sheet thickness 0.32 mm. After the cold pressing, the pressed material (sheet) was cured in an oven at 120° C. for 4 minutes.

Table 2 provides a summary of the manufactured samples, indicating the type of hBN activation, and the measured thermal conductivity of the formed composite bodies.

TABLE 2

| Sample | Activated hBN powder | Type of Activation | | Thermal Conductivity [W/mK] |
| | | Exfoliation | Chemical treatment | |
| --- | --- | --- | --- | --- |
| E1 | BN1 | Ball Mill | NaOH solution | 10.6 |
| C1 | BN2 | Ball Mill | Water | 4.6 |
| C2 | BN3 | Sonication | PDA | 3.5 |
| C3 | BN4 | — | Oxygen/Air Plasma | 3.1 |
| C4 | BN5 | — | GMA Plasma | 2.9 |
| C5 | BN control | — | — | 3.0 |

The data summarized in Table 2 show that a surprising increase of the thermal conductivity could be achieved if the hBN powder was activated via exfoliation in the ball mill in the presence of NaOH solution. This appears to be the best activation to make an efficient siliconization, which further has a strong influence on forming hBN containing composite bodies with silicone polymers wherein the obtained composite body has a high thermal conductivity.

It was possible to obtain with sample E1 a material having high thermal conductivity of 10.8 W/mK at an hBN amount of only about 34 vol % based on the total volume of the composite body.

Example 3

Composite bodies are formed the same way as in Example 2 for sample E1, except that different volume amounts for the hBN are used. The volume amounts are varied from 25 vol %, 30 vol % and 38 vol %. The thermal conductivity is, and the March Dollase orientation parameter are, being measured.

Example 4

Composite bodies are formed the same way as in Example 2 for sample E1, except that as organic polymer low polyethylene is used. The thermal conductivity and the March Dollase orientation parameter are being measured.

Example 5

A plurality of composite sheets as obtained in Example 2 for sample E1 are added to a multi-layer stack of sheets before curing. The stack is subjected to a compression treatment by applying a pressure and followed by a heat treatment to conduct curing of the silicone polymer.

From the pressed and cured multi-layer stack, a 0.5 mm thick composite slice is cut with a diamond wire. The composite slice is analyzed in its thickness direction (z) for the thermal conductivity. The thermal conductivity throughout the thickness direction (z-direction, also called through-plane) of the composite slice is being measured and expected to be at least 90% of the in-plane thermal conductivity of the multi-layer composite body of sample E1. An illustration of a composite slice with the through-plane oriented hBN particles (14) is shown in FIG. 1C.

Measuring the Thermal Conductivity

The thermal conductivity was measured using a transient plane source device (TPS 2500 S, Hot Disk Instruments). The instrument and measurement are designed by placing a temperature sensor between two samples of the test material, introducing a pulse of heat at the surface of the test sample, measuring the temperature change, and calculating based thereon the thermal conductivity. The temperature sensor was a Paton-insulated Hot Disk® sensor model 5501 (6.4 mm radius). The heat pulse was varied in the range of 60-150 mW for 3-15 seconds to make sure that the conductivity values stay constant independent of the pulse parameters. The measurements were conducted according to the Hot Disk Thermal Constants Analyser Instruction Manual (2015 Apr. 15) from Hot Disk®. For the measurements of the in-plane thermal conductivity was used the slab module, while for measuring the through-plane thermal conductivity was applied the anisotropic method.

Measuring the March-Dollase Orientation Parameter η

Figure 2A:
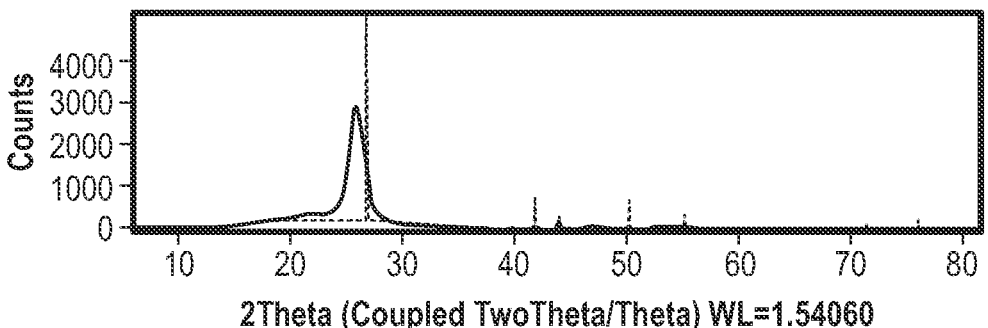
FIG. 2A includes a graph showing an X-ray spectrum of a body comprising in-plane oriented hBN particles according to one embodiment.

X-ray diffraction analysis was conducted to determine the degree of orientation (also called herein alignment) of the hBN particles within the composite body. In the case of in-plane aligned hBN platelets, the primary plane of interest was the in-plane direction parallel to the surface (such as the (002) plane). First, a 2D XRD spectrum was obtained after spot diffraction of the sample with a Bruker D8 diffractometer using a focused Cu Kα radiation (λ=1.5418 Å) in the step scan mode at angular positions ranging from 10° to 80°. Thereafter, a one-dimensional (1D) XRD spectrum was obtained by integration of the 2D spectrum using built-in capability of EVA software from Bruker. A Rietveld peak fitting methodology was used to compare the (002) peak intensity of the oriented hBN pattern against an un-oriented hBN database pattern to obtain a quantifiable measurement of orientation. An XRD spectrum showing the (002) peak is shown in FIG. 2A. As more (002) hBN planes align parallel to the surface the relative intensity of the (002) experimental peak increases compared to the database peak.

The peak fitting of the XRD pattern was performed using the Topas quantification software from Bruker. The Topas software has a built-in refinement functionality to determine the March-Dollase parameter using the March-Dollase function W(α), see equation (1):

$$W(\alpha) = \left(r^2\cos^2\alpha + \frac{1}{r}\sin^2\alpha\right)^{-3/2}., \qquad (1)$$

wherein W(α) is the fraction of crystallites oriented in the preferred direction, α is the angle between a crystallite plane (hkl) normal and the preferred orientation direction, and r is the March-Dollase parameter.

The degree of preferred orientation η (r) as a function of the March-Dollase parameter r can be calculated according to the equation (2) below:

$$\eta = 100\%\left[\frac{(1-r)^3}{1-r^3}\right]^{1/2}. \qquad (2)$$

Figure 2B:
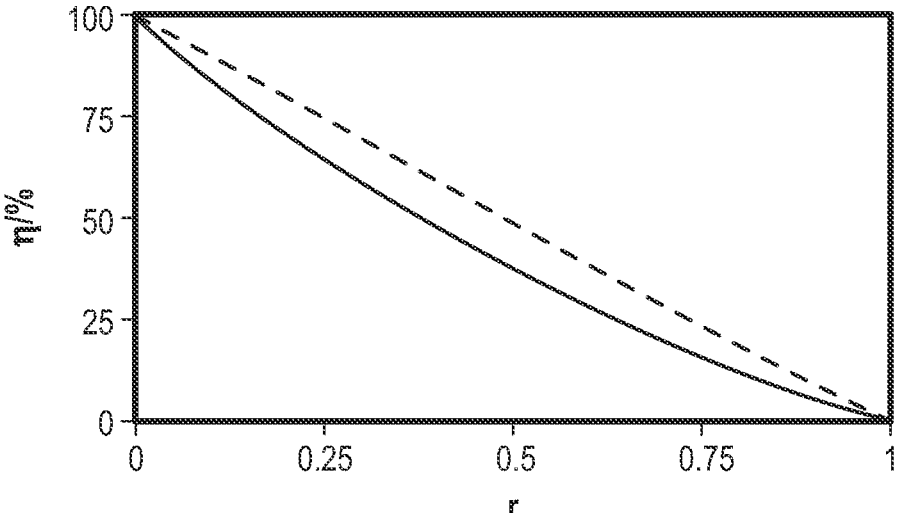
FIG. 2B includes a graph showing a relationship between r and orientation parameter $\eta$ according to the March-Dollase method.

The graph shown in FIG. 2B shows the relationship between the March-Dollase parameter r and the degree of preferred orientation η (r), which is herein also called "March-Dollase orientation parameter η." The solid line in the graph indicates the actually measured curve and the dashed line is a conversion of the curved line to a simplified linear trend line.

Measuring the Electric Volume Resistivity

The electric resistivity of the samples was determined according to ASTM D257.

Measuring of the Particle Size Distribution of hBN Particles

The particle size distribution of the hBN particles was measured by laser scattering using a Laser Scattering Particle Size Distribution Analyzer LA-950 from Horiba. The expressions median size (D50) and mean size are used according to the HORIBA manual definitions.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention.

What is claimed is:

1. A composite article comprising: a composite body including an organic polymer and ceramic particles comprising hexagonal boron nitride (hBN) particles distributed throughout the organic polymer, an amount of the hBN particles ranges from 20 vol % to 40 vol % based on a total volume of the composite body;

an amount of the hBN particles is at least 90 vol % based on a total volume of the ceramic particles;

the hBN particles comprise exfoliated hBN particles;

an average aspect ratio of length (L) to thickness (T) of the hBN particles is at least 5 and not greater than 200;

the hBN particles are oriented in plane within the composite body, and the composite body comprises an in plane-thermal conductivity of at least 10 W/mK.

2. The composite article of claim 1, wherein an in-plane March-Dollase orientation parameter n of the hBN particles within the composite body is at least 50%.

3. The composite article of claim 1, wherein the hBN particles have an average particle size (D50) of at least 1 micron and not greater than 70 microns.

4. The composite article of claim 1, wherein the hBN particles have a multi-modal particle size distribution.

5. The composite article of claim 1, wherein an electric volume resistivity of the composite body is at least 1.0E+12 Ω·cm.

6. The composite article of claim 1, wherein the organic polymer of the composite body includes a thermoplastic polymer or a thermoset polymer.

7. The composite article of claim 6, wherein the organic polymer includes a silicone polymer, an acrylate polymer, a polyurethane, an epoxide polymer, a polyamide, a polyimide, a liquid crystalline polymer (LCP), a fluoropolymer, a polyethylene, a polypropylene, a polystyrene, a polyester, a polycarbonate, a polybutylene terephthalate (PBT), a polyethylene terephthalate (PET), a polyamide, a liquid crystalline polymer (LCP), a polyacrylonitrile (PAN), a polyether ether ketone (PEEK), a polyetherketoneketone (PEKK), a polysulfone, a polyethersulfone, a polyphenylene oxide (PPO), a polyetherimide, a thermoplastic elastomer (TPE) a polyvinylidene fluoride (PVDF), a perfluoroalkoxy alkane (PFA), a fluorinated ethylene propylene (FEP), an ethylene tetrafluoroethylene (ETFE), or any copolymer thereof, or any combination thereof.

8. The composite article of claim 7, wherein the organic polymer includes a silicone polymer.

9. The composite article of claim 1, wherein the composite body further comprises a surfactant.

10. The composite article of claim 1, wherein an amount of the hBN particles is at least 92 vol % based on the total volume of ceramic particles.

11. The composite article of claim 10, wherein the ceramic particles of the composite body consist essentially of hBN particles.

12. The composite article of claim 1, wherein a surface of the hBN particles is functionalized with an organic compound.

13. The composite article of claim 12, wherein the organic compound is selected from a polysiloxane, a polysilane, a silane, or any combination thereof.

14. The composite article of claim 12, wherein the organic compound is covalently bonded to the surface of the hBN particles.

15. The composite article of claim 1, wherein the amount of the hBN particles ranges from 20 vol % to 35 vol %.

16. The composite articles of claim 15, wherein the amount of the hBN particles is at least 99 vol % based on the total volume of the ceramic particles.

17. The composite article of claim 1, wherein the thermal conductivity is at least 10 W/mK and not greater than 40 W/mK.

18. A composite article comprising: a composite body including an organic polymer and ceramic particles comprising hexagonal boron nitride (hBN) particles distributed throughout the organic polymer, the hBN particles comprising exfoliated hBN particles; wherein an amount of the hBN particles ranges from 20 vol % to 40 vol % based on a total volume of the composite body;

an amount of the hBN particles is at least 90 vol % based on a total volume of the ceramic particles;

an average aspect ratio of length (L) to thickness (T) of the hBN particles is at least 5 and not greater than 200;

an in-plane March-Dollase orientation parameter n of the hBN particles within the composite body is at least 50%; and the composite body comprises an in plane-thermal conductivity of at least 10 W/mK and not greater than 40 W/mK.

19. A method of forming a composite article, comprising:

preparing a mixture of ceramic particles and an organic polymer, wherein the ceramic particles comprise hBN particles, an amount of the hBN particles ranges from 20 to 40 vol % based on a total weight of the dispersion, the hBN particles comprise exfoliated hBN particles, an average aspect ratio of length (L) to thickness (T) of the hBN particles is at least 5 and not greater than 200, and an amount of the hBN particles is at least 90 vol % based on a total volume of the ceramic particles, applying a layer of the mixture to a mold or support;

conducting an alignment procedure of the hBN particles; and solidifying and/or curing the organic polymer or organic polymerizable material to form a composite body, wherein an in-plane thermal conductivity of the composite body is at least 10 W/mK.

20. The method of claim 19, further comprising surface functionalizing the hBN particles before preparing the mixture.

21. The method of claim 20, wherein surface functionalization includes exfoliating and activating the hBN particles to form activated hBN particles, and treating the activated hBN particles with an organic compound, the organic compound including a polysiloxane comprising silicon hydride groups, or a polysilane, or a silane compound, or any combination thereof.

22. The method of claim 21, wherein exfoliating includes ball-milling and activating includes introducing OH-groups on a surface of the hBN particles.

23. The method of claim 22, wherein introducing OH-groups includes treatment with NaOH solution concurrently during ball milling.

\* \* \* \* \*